United States Patent [19]
Rodger

[11] 3,877,419
[45] Apr. 15, 1975

[54] MILKING STATION
[75] Inventor: Keith Rodger, Tumba, Sweden
[73] Assignee: The De Laval Separator Company, Poughkeepsie, N.Y.
[22] Filed: Oct. 10, 1973
[21] Appl. No.: 404,925

[30] Foreign Application Priority Data
  Oct. 12, 1972  France .............................. 72.36148

[52] U.S. Cl. ............................... 119/14.03; 119/27
[51] Int. Cl. ............................................... A01j 5/00
[58] Field of Search ........................... 119/14.03, 27

[56] References Cited
UNITED STATES PATENTS
2,696,801  12/1954  Hill ................................. 119/14.03
2,714,367  8/1955  Arnold ................................. 119/27

Primary Examiner—Hugh R. Chamblee
Attorney, Agent, or Firm—Cyrus S. Hapgood

[57] ABSTRACT

A raised platform-stall has a first part on which animals can be positioned for milking while feeding from a manger located at one side of the stall, and a second part of the stall forms a foot path along the side of the stall farthest from the manger. After the animals have taken up position in front of and at right angles to the manger, the second stall part can be pushed under the first part so that the milking personnel can readily apply the milking units from behind the animals.

5 Claims, 4 Drawing Figures

MILKING STATION

THE DISCLOSURE

The present invention relates to animal milking stations; and while the invention is applicable to the milking of various animals, it will be described and illustrated in connection with the milking of ewes or goats in particular.

The milking station of the present invention comprises a platform-stall for the ewes or goats, one side of which is equipped with a manger and, preferably, a partition-railing through which the animals can insert their heads for feeding in connection with milking. The platform-stall is positioned at a height above the ground suitable to the milking personnel. The invention is particularly characterized by the fact that the platform-stall is arranged so that the depth from the manger can be reduced, from a depth including a footpath along the side farthest away from the manger, to a depth approximately equal to the length of the animals after they have taken up position in front of and at right angles to the manger.

In a preferred embodiment, the platform-stall is divided into two parts by a line parallel to the manger, the part farthest away from the manger being constructed so that it can be pushed underneath the other part, thereby altering the depth to the manger.

In certain Mediterranean countries with large numbers of sheep, ewes are widely used for milk production. Due to the fact that each ewe only gives a comparatively small quantity of milk at each milking, and that a comparatively large number of animals have to be milked, it is very important to ease and rationalize the work as much as possible. In this respect, several constructions of stalls have been made. A construction which is common and has been used for a number of years is described in French Pat. No. 1,130,015. Other constructions are described in French Pat. Nos. 1,504,353 and 2,109,338.

The main aim for the construction of a milking station for ewes is to achieve a positioning of ewes and personnel such that the milker does not need to bend down to apply the milking unit and that application can take place from behind the ewes. Also, the milker must be able to approach close to the animals to permit easy application and removal of the milking units.

The construction referred to in the French Pat. No. 1,310,015 achieves these objects but has a serious disadvantage, explained as follows. The construction consists of a mobile row of stalls which are equipped on one side with a manger and on the other side with dividing partitions between which the ewes are positioned for feeding in connection with milking. When the ewes have been positioned in the stalls, the whole row is traversed towards a milking pit which is situated behind the ewes. The animals, who can number up to 20 or more, are thereby forced backwards towards the pit. Normally, all animals have an instinctive resistance to backing due to the fact that they cannot see backwards. It is to a high degree unfavorable for the milking process. The animal does not let down the milk normally and the production can be adversely affected.

The construction described in the French Specification Nos. 1,504,353 and 2,109,338 serve the purpose of facilitating the milking operation, but they are complicated and expensive devices.

The construction according to the present invention eliminates the aforementioned disadvantages and has certain other advantages.

The invention will be described more in detail below with reference to the accompanying drawings, in which FIG. 1 is an end view of one embodiment of the milking station;

Figure 1:
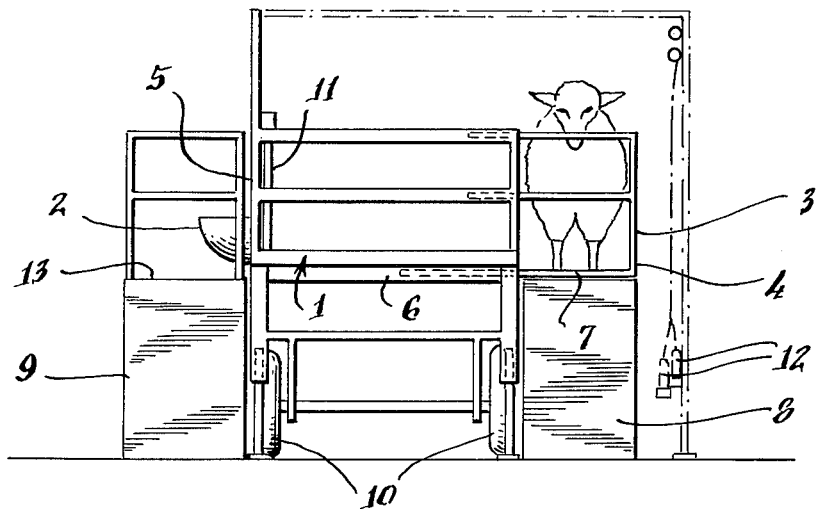

In the drawings, a number of ewes can be positioned for milking on a platform-stall 1. As shown, the platform-stall is mounted on wheels 10 and is thereby transportable. The milking station can, of course, be static. The platform-stall 1 is in all cases placed at such a level above the ground that the ewes are easily accessible during milking. Naturally, the ewes can mount and dismount the platform-stall in different ways; but in the illustrated embodiment the ewes themselves mount by means of a ramp 8 and after milking go down a ramp 9. The ramps can be either stationary or transportable.

Along one side 5 of the platform-stall, a manger 2 is situated from which the ewes consume a suitable feed during milking. In front of the manger is a partition-railing 11, through which the ewes can insert their heads. The platform-stall as shown is divided into two parts 6 and 7 along a line parallel to side 5. Part 7, which is farthest away from the manger, serves as a footpath for the animals when they line up in front of the manger, and it is constructed to slide in under part 6.

Figure 2:
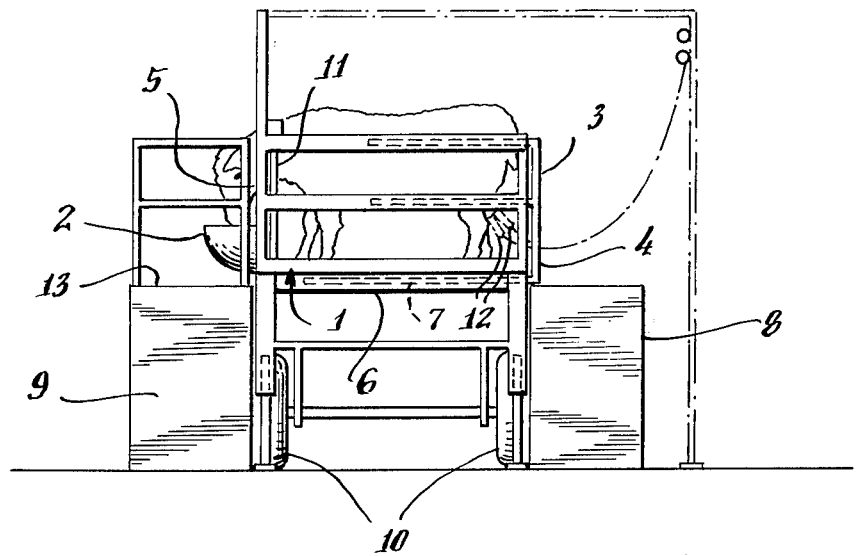
FIG. 2 is a view similar to FIG. 1 but with part of the platform-stall pushed in under the remaining part of the platform-stall.
Figure 3:
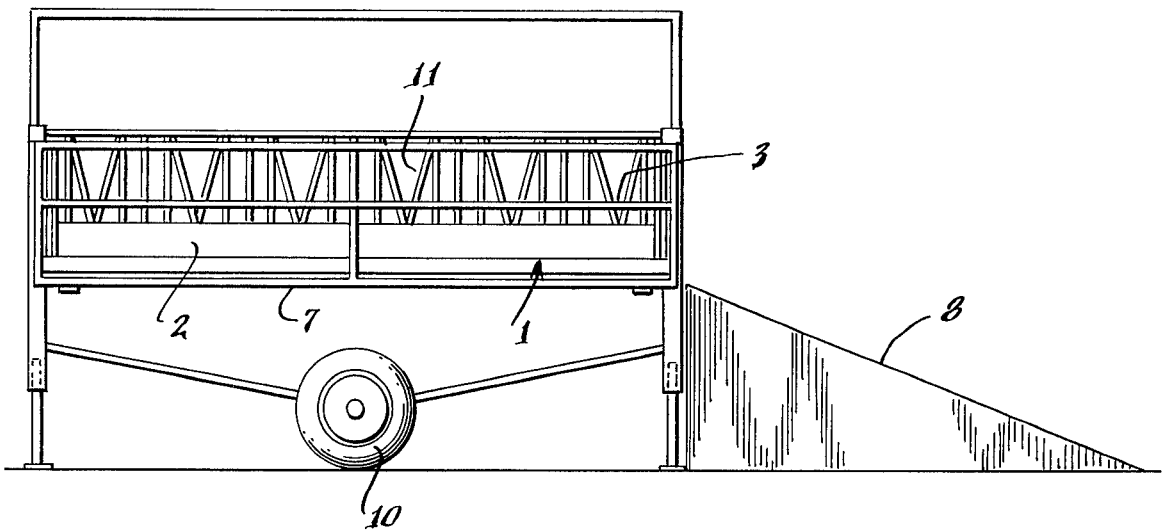
FIG. 3 is a side view of the milking station.
Figure 4:
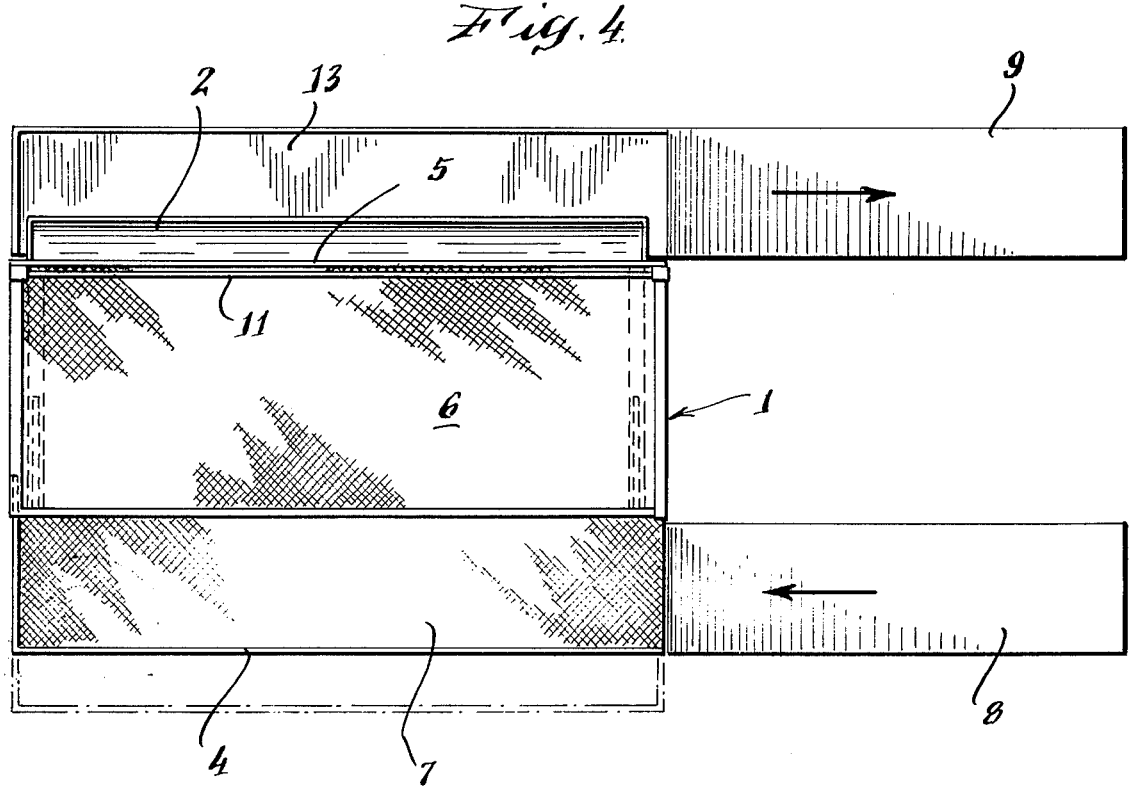
FIG. 4 is a plan view of the milking station.

When a group of ewes, suitable in number to the size of the platform-stall, are to be milked, they are directed up ramp 8 and on to the platform-stall, as shown in FIG. 1. The animals take up position by the manger 2 and at right angles to it. Part 7 of the platform-stall is then pushed in under part 6, and the depth of the platform-stall from side 4 to the manger is thereby reduced to approximately the length of the ewes after they have taken up their positions, as stated above. The area immediately behind the ewes thereby becomes free for milking personnel who can easily approach the animals and apply the milking units. This is shown in FIG. 2, where the milking unit is shown at 12.

The platform-stall has a rail 3 or similar arrangement mounted on side 4, which is opposite to side 5 where the manger is situated. This arrangement is to prevent the ewes from stepping outside side 4 when the depth of the platform-stall is reduced to correspond to the length of the animals.

When the milking is completed and the animals have eaten their feed, the partition-railing 11 is released from the platform-stall so that the ewes exit on to platform 13 on the outside of the manger, after which they go down the exit ramp 9. By means of a simple arrangement (not shown), the partition-railing 11 can be raised or swung on a horizontal axle.

In an alternative structure, the manger can have a raised edge to prevent the ewes from moving from their places prior to and during milking. This eliminates the necessity of a partition-railing 11. When the milking is completed, the manger arrangement is released from the platform-stall, as by pushing it forward over platform 13, thereby leaving the passage clear for the animals. It is also possible to release both manger and partition-railing to give a clear exit passage.

I claim:

1. A milking station for animals which comprises a raised platform-stall having rail means for at least partly confining animals thereon and including a first part on which a plurality of animals can be positioned for milking, a manger located on one side of the platform-stall and from which the animals can feed in connection with milking, the station being characterized in that the raised platform-stall includes a second part forming a foot path along the side of the platform-stall farthest from the manger, one of said parts being movable relative to the other to reduce the depth of the platform-stall, as measured from the manger, from a depth including said path to a depth approximately equal to the length of the animals after they have taken up position in front of and at right angles to the manger.

2. The station of claim 1, in which said two parts are divided along a line parallel to the manger, said second part being adapted to be pushed underneath the first part to reduce said depth from the manger.

3. The station of claim 1, comprising also upright rail means located on said second part and extending along the side of the platform-stall opposite to said side on which the manger is located, said means preventing the animals from stepping over said side opposite to the manger when the depth of the platform-stall has been reduced.

4. The station of claim 1, comprising also ramps on which the animals can ascend to and descend from the platform-stall.

5. The station of claim 1, comprising also wheels on which the platform-stall is mounted for transport.

* * * * *